(12) United States Patent
Lu et al.

(10) Patent No.: US 11,738,807 B2
(45) Date of Patent: Aug. 29, 2023

(54) COILED TUBING TRAILER

(71) Applicant: NATIONAL OILWELL VARCO, L.P., Houston, TX (US)

(72) Inventors: Mike Xiaolei Lu, Arlington, TX (US); Joseph Welk, Godley, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 17/595,744

(22) PCT Filed: Apr. 24, 2020

(86) PCT No.: PCT/US2020/029875
§ 371 (c)(1),
(2) Date: Nov. 23, 2021

(87) PCT Pub. No.: WO2020/242685
PCT Pub. Date: Dec. 3, 2020

(65) Prior Publication Data
US 2022/0219756 A1    Jul. 14, 2022

Related U.S. Application Data

(60) Provisional application No. 62/852,630, filed on May 24, 2019.

(51) Int. Cl.
*B60P 3/035* (2006.01)
*B62D 21/14* (2006.01)
(Continued)

(52) U.S. Cl.
CPC .............. *B62D 21/14* (2013.01); *B60P 3/035* (2013.01); *B62D 21/09* (2013.01); *B62D 21/20* (2013.01); *B62D 61/10* (2013.01); *E21B 19/22* (2013.01)

(58) Field of Classification Search
CPC .................................. E21B 19/22; B60P 3/035
See application file for complete search history.

(56) References Cited

U.S. PATENT DOCUMENTS 5,622,116 A * 4/1997 Carlton .................. B60P 3/035
296/25
6,273,188 B1 * 8/2001 McCafferty ............. E21B 19/22
280/789
(Continued)

FOREIGN PATENT DOCUMENTS

| CN | 105459879 | 4/2016 |
|---|---|---|
| WO | 2020242685 | 12/2020 |

OTHER PUBLICATIONS

"International Application Serial No. PCT US2020 029875, International Search Report dated Jul. 9, 2020", 2 pgs.
(Continued)

*Primary Examiner* — James A English
(74) *Attorney, Agent, or Firm* — Schwegman Lundberg & Woessner, P.A.

(57) ABSTRACT

A trailer assembly for carrying coiled tubing includes a main beam assembly extending from a forward end of the trailer assembly to a rear end of the trailer assembly. The main beam assembly includes a forward portion that extends from the forward end of the trailer assembly, a rear portion that extends to the rear end of the trailer assembly, and a middle portion connected between the forward portion and the rear portion and configured to transfer load to the forward portion and the rear portion. The middle portion includes an upper beam section, and a lower beam section vertically separated from the upper beam section. The upper beam section is configured to share a load resultant from a bending force experienced by the lower beam section.

20 Claims, 6 Drawing Sheets

(51) Int. Cl.
  *B62D 21/09*    (2006.01)
  *B62D 21/20*    (2006.01)
  *B62D 61/10*    (2006.01)
  *E21B 19/22*    (2006.01)

(56) References Cited

U.S. PATENT DOCUMENTS

| | | | |
|---|---|---|---|
| 6,491,107 B2 | 12/2002 | Dearing et al. | |
| 6,634,436 B1 * | 10/2003 | Desai | E21B 15/00 173/186 |
| 8,220,817 B2 | 7/2012 | Ehrlich et al. | |
| 9,316,067 B1 * | 4/2016 | Lu | E21B 19/22 |
| 10,272,950 B1 * | 4/2019 | Smith, Jr. | B62D 33/02 |
| 2013/0341001 A1 * | 12/2013 | Kos | E21B 19/22 166/77.2 |

OTHER PUBLICATIONS

"International Application Serial No. PCT US2020 029875, Written Opinion dated Jul. 9, 2020", 6 pgs.
"International Application Serial No. PCT US2020 029875, International Preliminary Report on Patentability dated Dec. 2, 2021", 8 pgs.

\* cited by examiner

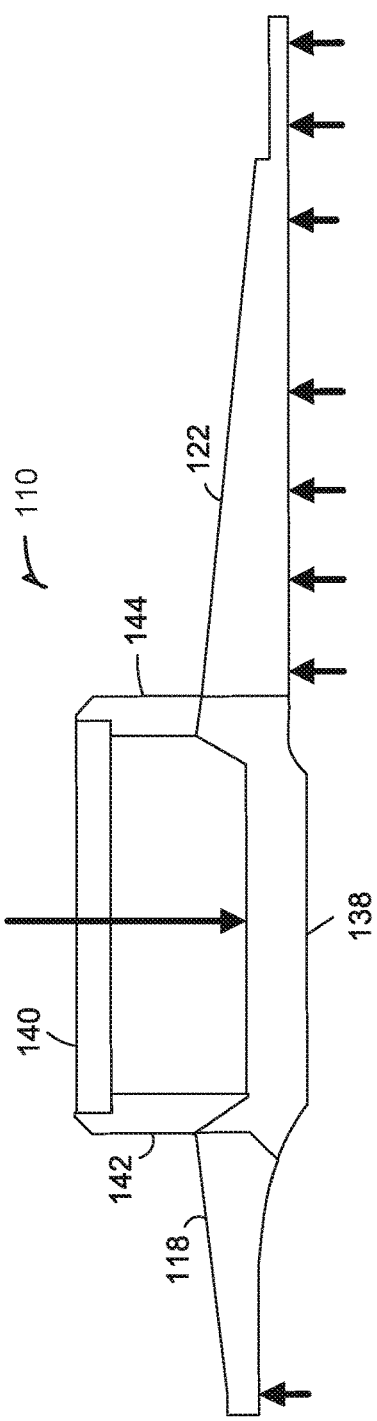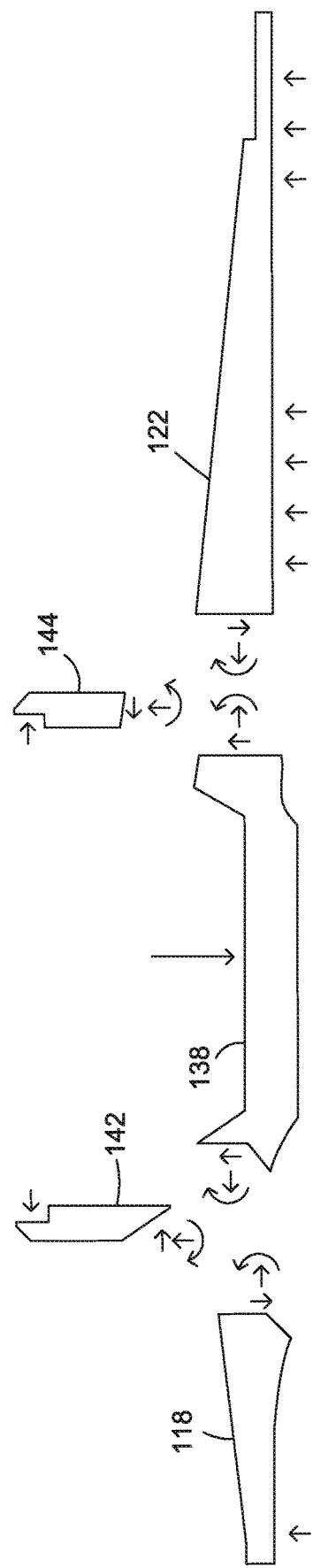

COILED TUBING TRAILER

CLAIM OF PRIORITY

This patent application is a U.S. National Stage Filing under 35 U.S.C. 371 from International Application No. PCT/US2020/029875, filed Apr. 24, 2020 which claims the benefit of priority to U.S. Provisional Application Ser. No. 62/852,630, filed May 24, 2019, each of which are incorporated by reference herein in their entirety.

TECHNICAL FIELD

This document pertains generally, but not by way of limitation, to coiled tubing trailers, and particularly but not by way of limitation to beam design for coiled tubing trailers.

BACKGROUND

Coiled tubing can be used for a wide range of oilfield services and operations. For example, coiled tubing can be used for drilling and, more frequently, after a well is drilled for logging, cleanouts, fracturing, cementing, fishing, completion, and production related operations. Coiled tubing refers to a string of steel pipe that is continuously milled and coiled onto a large take-up reel for transportation and handling.

The reel is often transported on a large trailer, which may need to satisfy several regulations for use on the road. Some conventional heavy-duty trailers utilize extra axles and a booster at the rear of the trailer to increase the trailer load capacity and reduce the individual axle loads to meet regulations. However, this may require the trailer to be quite long, limiting maneuverability. The overall size and weight of the trailer may also be limited by regulations, so the extra weight from the large beam sizes and extra booster may limit the overall coiled tubing carrying capacity.

SUMMARY

The present inventors have recognized, among other things, that redesigning the main trailer beams to include a middle "bridge-type" section can reduce the length of a coiled tubing trailer while also increasing the load capacity of the trailer. The bridge-type sections of the main beams include vertically separated upper and lower beams connected to forward and rear beam sections to form a complete beam assembly on each side of the trailer that spans from the forward end of the trailer to the rear end. The bridge-type beam section shares load between the lower beam section and the upper beam section resultant from a bending force experienced by the lower beam section, significantly increasing the trailer beam bending capacity over conventional designs, allowing increased carrying capacity. Additionally, because of the increased carrying capacity of the bridge-type beam design, the inner main beams used by conventional trailers can be removed. By eliminating the inner main beams, transition areas between the outer and inner main beams can be eliminated, allowing the forwardmost rear axle of the trailer to move forward, reducing the overall length of the trailer and in turn, the overall weight.

In an example, a trailer assembly for carrying coiled tubing includes a main beam assembly extending from a forward end of the trailer assembly to a rear end of the trailer assembly. The main beam assembly includes a forward portion that extends from the forward end of the trailer assembly, a rear portion that extends to the rear end of the trailer assembly, and a middle portion connected between the forward portion and the rear portion and configured to transfer load to the forward portion and the rear portion. The middle portion includes an upper beam section, and a lower beam section vertically separated from the upper beam section. The upper beam section is configured to share a load resultant from a bending force experienced by the lower beam section.

In another example, a coiled tubing unit includes a trailer. The trailer includes a main beam assembly and a reel configured to carry coiled tubing. The main beam assembly extends from a forward end of the trailer to a rear end of the trailer, and includes a forward portion adjacent the forward end of the trailer, a rear portion adjacent the rear end of the trailer, and a middle portion connected between the forward portion and the rear portion. The middle portion includes an upper beam section and a lower beam section vertically separated from the upper beam section, and the upper beam section is configured to share a load resultant from a bending force experienced by the lower beam section. The reel is positioned adjacent the middle portion of the main beam assembly of the trailer.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 2A and 2B are free body diagrams illustrating beam assemblies of a coiled tubing trailer.

DETAILED DESCRIPTION

A coiled tubing trailer is disclosed herein that includes main beam assemblies that extend from a forward end to a rear end of the trailer. The main beam assemblies can include forward, middle, and rear portions. The middle portion is a "bridge-like" assembly that includes an upper beam portion and a lower beam portion vertically separated from one another. Conventional beam assemblies may include one long continuous beam that extends from the forward end of the trailer to the rear end. These long continuous beams may experience significant bending and shear forces and thus, may need to be quite thick and bulky toward the middle of the beam assembly. By incorporating the bridge-type beam section, the middle portion shares load between the lower beam section and the upper beam section resultant from a bending force experienced by the lower beam section, significantly increasing the trailer beam bending capacity over conventional designs. This facilitates increased carrying capacity, which allows the trailer to carry larger loads without increasing the weight of the beam assemblies.

In conventional trailers, in addition to the main outer beams, inners beams may be included that run parallel to the main outer beams. The main inner beams may be used for supporting the suspension of the conventional trailer and may include bulky transition areas that utilize transition beams to transfer load from the main outer beams to the main inner beams. Because of the size and location of these transition areas, the position of the forward-most rear axle of the trailer may be limited. Thus, in order to satisfy weight-per-axle regulations, the length of the conventional trailer may be increased due to the transition areas.

In contrast to the conventional beam designs, use of bridge-type assembly facilitates elimination of inner main beams, which eliminates the bulky beams used in the transition area of many conventional trailers. By eliminating the transition area, the forward-most rear axle is able to be positioned further forward than in conventional designs, allowing the trailer to be shorter while still capable of handling similar loads. The shorter trailer reduces the overall weight and cost of the trailer, allowing more coiled tubing to be carried by the trailer while still satisfying road regulations.

Figure 1A:
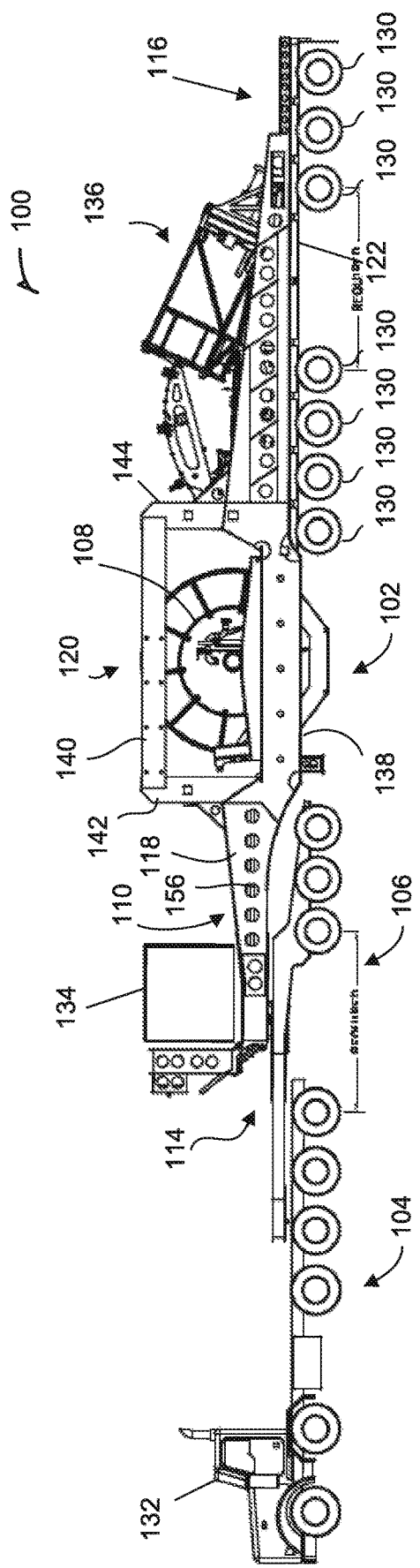
FIG. 1A is a side view illustrating a coiled tubing unit that includes a coiled tubing trailer.
Figure 1B:
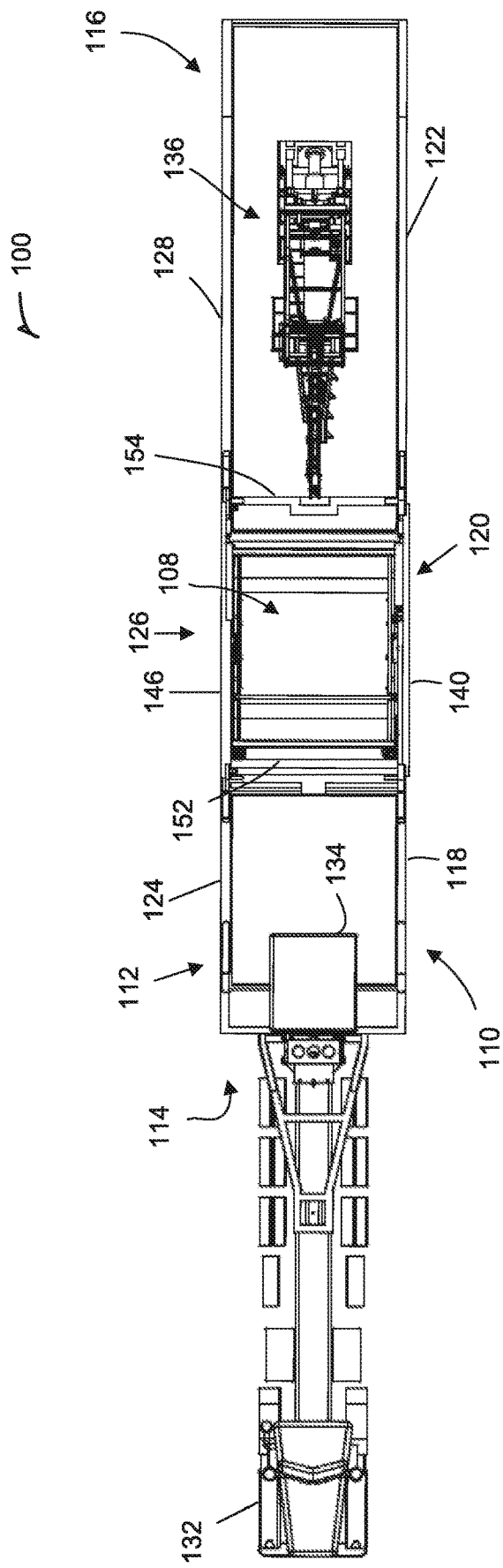
FIG. 1B is a top view illustrating a coiled tubing unit that includes a coiled tubing trailer.
Figure 1C:
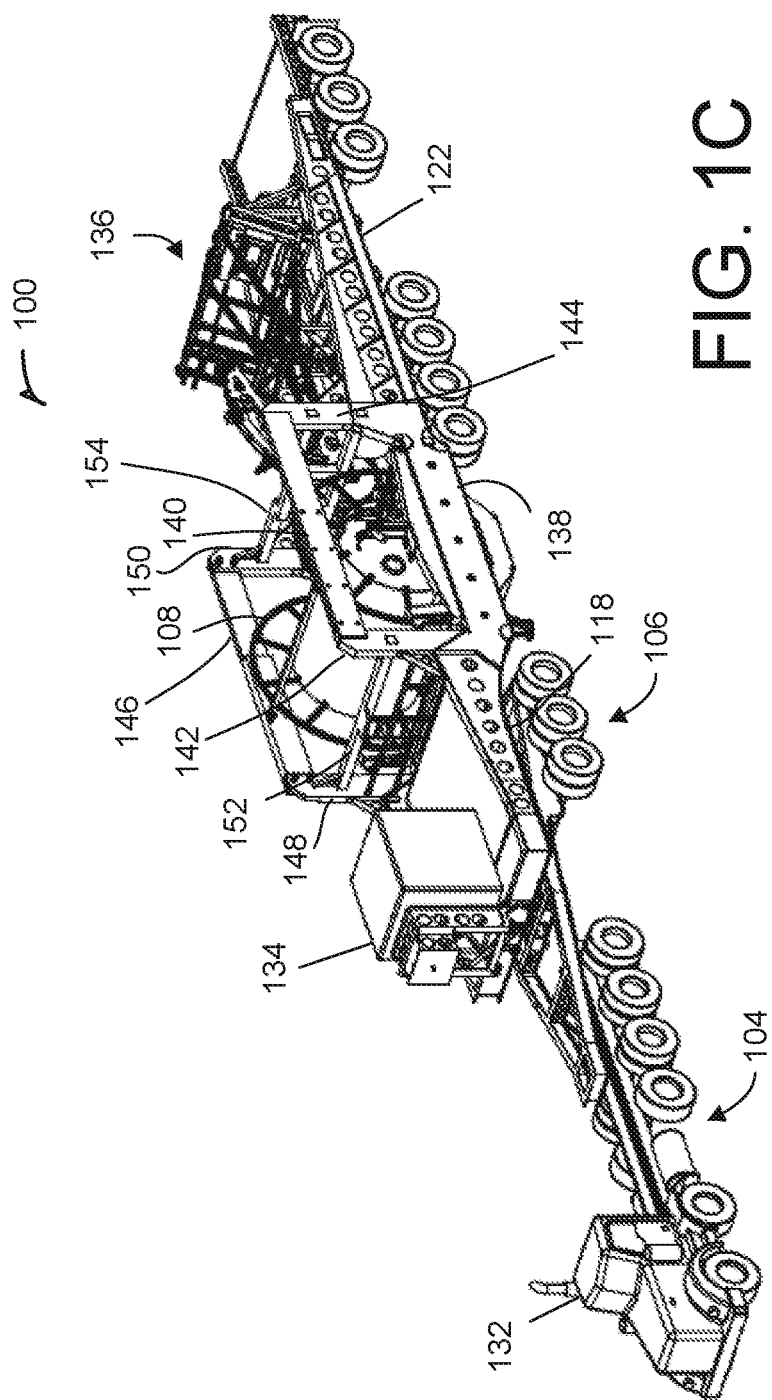
FIG. 1C is a perspective view illustrating a coiled tubing unit that includes a coiled tubing trailer.

FIGS. 1A-1C are a side view, top view, and perspective view, respectively, illustrating a coiled tubing unit 100 that includes a coiled tubing trailer 102. In the example illustrated in FIGS. 1A-1C, the coiled tubing unit 100 includes the coiled tubing trailer 102, a tractor 104, and a trailer jeep 106. The coiled tubing unit 100 is designed to transport a reel 108 of coiled tubing for use in oilfield applications, for example.

The coiled tubing trailer 102 includes two main beam assemblies 110 and 112 that run along the outer edges of the trailer 102 from a forward end 114 to a rear end 116 of the trailer 102. The main beam assemblies 110 and 112 can be formed of any desirable material, such as steel, for example, and are configured to handle a majority of the trailer load. The main beam assemblies may have an "I-beam" shape (i.e., include flanges and a web) or any other desirable beam shape. The main beam assembly 110 includes forward portion 118, middle portion 120, and rear portion 122, and the main beam assembly 112 includes forward portion 124, middle portion 126, and rear portion 128. The trailer 102 also includes several wheels 130 carried by respective axles (shown in FIG. 3B). While illustrated as seven axles, any number of axles can be included as may be needed to satisfy regulations, such as load-per-axle regulations, for example.

The trailer 102 can be pulled by a tractor 104 that includes a tractor cabin 132 used by an operator to drive the tractor 104. The tractor 104 may be used to pull the trailer 102 to a well site, for example, close to a wellhead. The trailer jeep 106 may be connected between the trailer 102 and the tractor 104 and include additional axles to further support the load carried by the trailer 102. The trailer jeep 106 may also be pivotably connected to both the tractor 104 and the trailer 102 to provide increased maneuverability for the trailer unit 100.

The trailer 102 may be configured for carrying and deploying coiled tubing for oilfield applications, for example. Coiled tubing may be used for drilling and, more frequently, after a well is drilled for logging, cleanouts, fracturing, cementing, fishing, completion, and production related operations. To facilitate these operations, in addition to the coiled tubing reel 108, the trailer 102 may include an operator cabin 134 and an injector assembly 136. The operator cabin 134 may be provided for a person operating the injector assembly 136, for example, and may include input controls, status displays, and any other components. The injector assembly 136 may be used to deploy the coiled tubing carried by the reel 108 for the oilfield applications. The trailer 102 may include various beds or other structures supported by the main beam assemblies 110 and 112 that are used to carry or otherwise support the reel 108, the cabin 134, the injector assembly 136, and any other coiled tubing components transported by the trailer 102.

Conventional coiled tubing trailers may include long continuous split beams that run through the trailer body to handle the load of the coiled tubing. However, due to bending and shear loads experienced by these beams, especially in the middle portion of the beams, the beams may have a large and bulky design in order to sufficiently carry the load. In contrast, the beam assemblies 110 and 112 include bridge-type middle portions 120 and 126, which provide a large moment of inertia, significantly increasing the beam bending capacity of the beam assemblies 110 and 112 over the conventional beam designs. Middle portion 120 of the beam assembly 110 includes a lower beam portion 138, an upper beam portion 140, and vertical beam portions 142 and 144, and middle portion 126 includes a lower beam portion, an upper beam portion 146, and vertical beam portions 148 and 150.

The vertical beam portions 142 and 144 can be rigidly connected to the lower beam portion 138 and the upper beam portion 140 through pins, welding, or any other method of rigidly connecting the beam portions. Likewise, the lower beam portion 138 can be rigidly connected to the forward beam portion 118 and the rear beam portion 122 through pins, welding, or any other method of rigidly connecting the beam portions. The upper beam portion 140 is vertically separated from the lower beam portion 138 using the vertical beam portions 142 and 144. The vertical separation of the beam portions 142 and 144 can be any distance used to achieve a desired moment of inertia for the beam assembly 110. For example, the upper beam portion 140 may be vertically separated from the lower beam portion 138 by the greatest distance that still allows the trailer 102 to satisfy any height requirements imposed by a jurisdiction within which the trailer 102 may be used. By using this configuration, the middle portion 112 of the beam has a much higher moment of inertia than the conventional beam assemblies, and also allows easy access to the coiled tubing reel 108. This significantly increases the carrying capacity of the trailer 102, allowing more coiled tubing to be carried by the trailer 102.

The middle portion 126 of the beam assembly 112 may be configured similarly to the middle portion 120 of the beam assembly 110. The middle portions 120 and 126 are positioned adjacent to the reel 108 so as to handle the majority of the load carried by the beam assemblies 110 and 112. Tie rods 152 and 154 may be connected between upper beam portions 140 and 146 to provide stability for the middle portions 110 and 112. The tie rods 152 and 154 may be box tubing or any other type of connector configured to provide stability between the middle portions 120 and 126 of the beam assemblies 110 and 112.

The forward beam portions 118 and 124 may be upwardly tapered toward the respective middle portions 120 and 126, and the rear beam portions 122 and 128 may be downwardly tapered toward the rear end 116 of the trailer 102. In other examples, the forward beam portions 118 and 124 and the rear beam portions 122 and 128 may include any shape to provide the desirable weight and carrying capacity for the trailer 102. The beam assemblies 110 and 112 may also include numerous "lightening" holes 156 as illustrated, which can provide decreased weight as well as aesthetic appeal for the beam assemblies 110 and 112.

FIG. 2A is a free body diagram illustrating the forces experienced by the beam assembly 110, and FIG. 2B is a free body diagram illustrating the forces experienced by each portion of the beam assembly 110. While illustrated for the beam assembly 110, similar forces may be experienced by the beam assembly 112. The majority of the load carried by the beam assembly 110 may be a result of the reel 108 of coiled tubing, illustrated by the force applied to lower beam portion 138. This force is experienced as a bending load by the lower beam portion 138.

The bending load experienced by the lower beam portion 138 is transferred to the front beam portion 118, the rear beam portion 122, and the vertical beam portions 142 and 144 through rigid connections. The vertical beam portions 142 and 144 transfer the bending load from 138 to the upper beam portion 140. The upper beam portion 140 receives this load as a compression force from the vertical beam portions 142 and 144, allowing the upper beam portion to share the load resultant from the bending force experienced by the lower beam section. The upper beam portion 140, in conjunction with the lower beam portion 138, establishes a much greater moment of inertia and section modulus as compared to a lower beam alone, which greatly increases the bending capacity of the beam assembly 110 as a whole when compared to prior art systems. While illustrated as a bridge-type assembly, any other rigid beam assembly may be used for the middle beam portion 120 that allows an upper beam portion to share a load resultant from a bending force experienced by a lower beam portion, such as a truss-type assembly, for example.

Figure 3A:
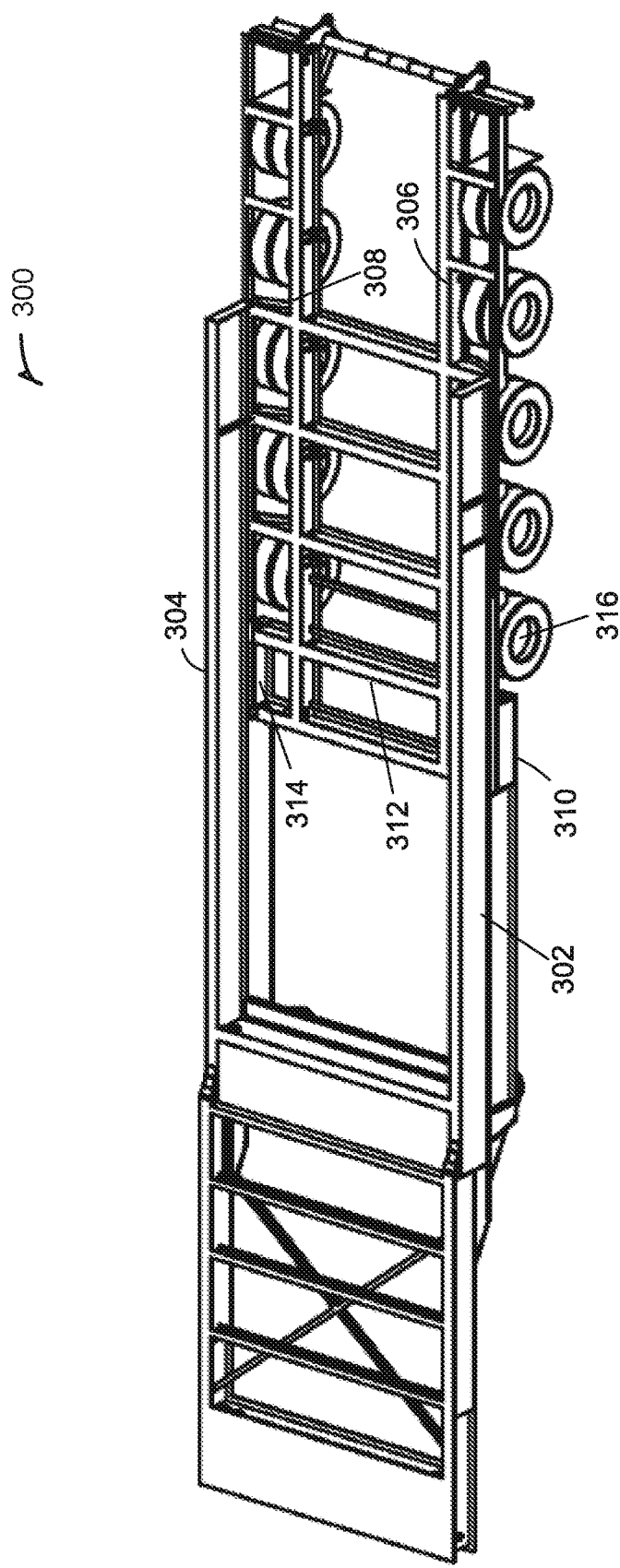
FIG. 3A is a perspective view illustrating a frame of a conventional coiled tubing trailer.

FIG. 3A is a perspective view illustrating a frame 300 of an example conventional coiled tubing trailer. The frame 300 includes outer main beams 302 and 304, inner main beams 306 and 308, transition beams 310, 312, and 314, and forward-most rear axle 316. The inner main beams 306 and 308, which may be I-beams, for example, may be used for carrying both the suspension as well as the main load carried by the trailer. The inner main beams 306 and 308 run parallel to the outer main beams 302 and 304 and extend from the middle of the outer main beams 302 and 304 to the rear end of the trailer. Bulky transition beams 310, 312, and 314 may be utilized to transition the load from the outer main beams 302 and 304 to the inner main beams 306 and 308. These transition beams 310, 312, and 314 are located near the middle portion of the frame 300, close to a carried reel of coiled tubing. Because the transition beams 310, 312, and 314 are used to transfer load, the transition beams 310, 312, and 314 may be quite large, preventing a forward-most rear axle 316 from being located as far forward as may be desired.

Figure 3B:
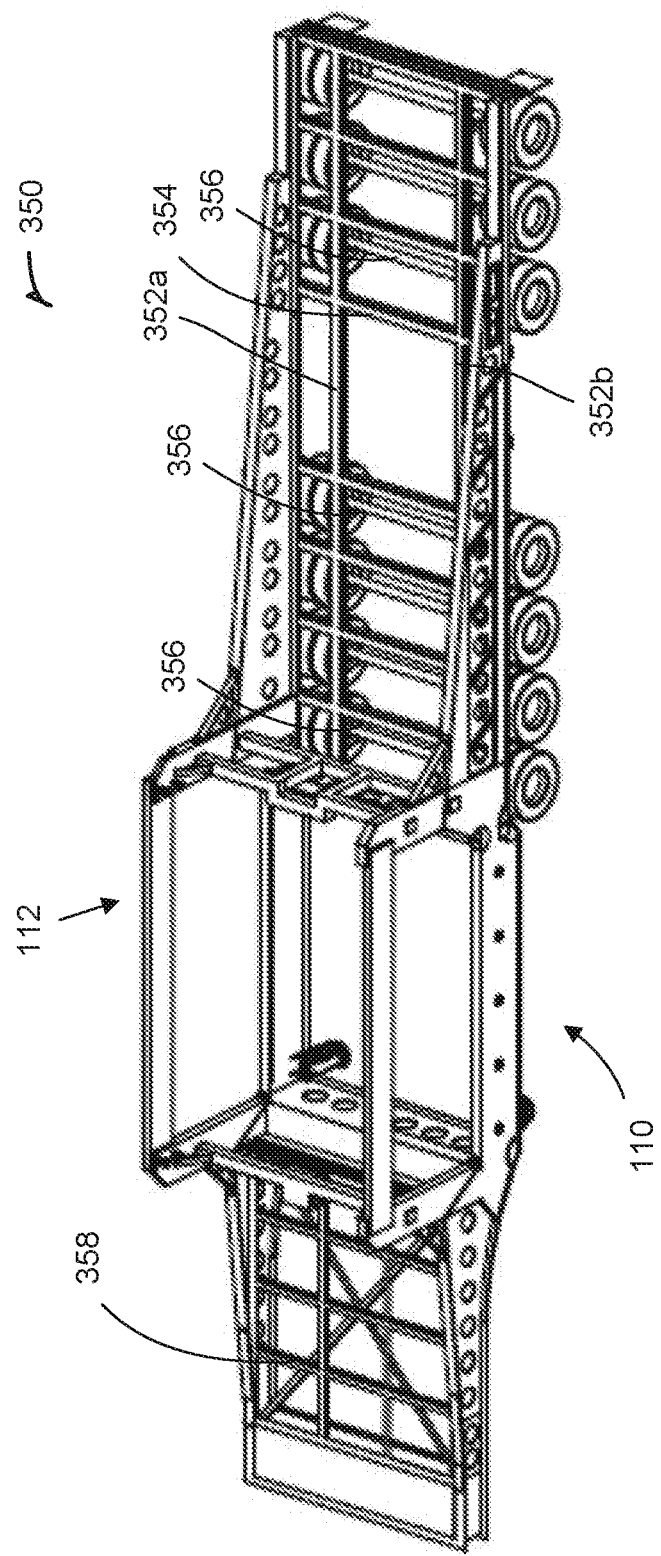
FIG. 3B is a perspective view illustrating a frame of a coiled tubing trailer.

FIG. 3B is a perspective view illustrating a frame 350 of the trailer 102 illustrated in FIGS. 1A-1C. The frame 350 includes the main beam assemblies 110 and 112, suspension beams 352a and 352b, cross beams 354, axles 356, and further support structure 358. The suspension beams 352a and 352b and the cross beams 354 are positioned and configured to carry the axles 356, which attach to the wheels 130 illustrated in FIGS. 1A-1C. The suspension beams 352a and 352b, the cross beams 354, and the support structure 358 are also configured to support a bed or other structure used to carry the injector assembly 136, the trailer cabin 134, and/or other coiled tubing components.

Unlike the conventional trailer frame 300, the frame 350 does not include any additional main I-beams beyond the main beam assemblies 110 and 112 for carrying the main load. The suspension beams 3522a and 352b, which can be implemented as box tubing or any other structures, are used to carry the suspension of the trailer 102, and not to provide substantial support for the main load. Because of this, there is no need for transition beams 310, 312, and 314 to transition load from the main beam assemblies 110 and 112 to the suspension beams 352a and 352b, allowing the axles 356 to be moved forward as compared to the axle 316 of the conventional trailer design. Thus, the forward-most axle 356 can be located very close to the reel 108 (FIGS. 1A-1C).

Many jurisdictions and/or roadways include regulations that limit the load-per-axle as well as the overall weight of a trailer. Thus, the number of axles required for a trailer depends on the total load carried by the trailer. In conventional trailers, because the axle had to be pushed back from the reel due to the transition area, the length of the trailer was increased to accommodate the required number of axles to handle the load. Additionally, some conventional trailers required boosters attached to the rear end of the trailer that included further axles to handle the load. These boosters are bulky and increase the overall weight of the coiled tubing unit, limiting the amount of coiled tubing that can be carried (due to overall weight restrictions).

By allowing the forward-most axle 356 to move closer to the reel 108, the total length of the trailer 102 can be reduced while including the same number of axles 356 to handle the load. This allows the overall material weight of the trailer to be reduced, which allows more coiled tubing and other supplies to be carried by the trailer without exceeding overall road weight restrictions.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A trailer assembly for carrying coiled tubing, the trailer assembly comprising:
   a first main beam assembly extending from a forward end of the trailer assembly to a rear end of the trailer assembly, wherein the first main beam assembly comprises:
   a forward portion that extends from the forward end of the trailer assembly;
   a rear portion that extends to the rear end of the trailer assembly; and
   a middle portion connected between the forward portion and the rear portion and configured to transfer load to the forward portion and the rear portion, wherein the middle portion comprises:
   an upper beam section;
   a lower beam section vertically separated from the upper beam section; and
   first and second vertical beam sections connected to the lower beam section with rigid, bending load transferring connections,
   wherein the upper beam section is configured to share a load resultant from a bending force experienced by the lower beam section.

2. The trailer assembly of claim 1, wherein the upper beam section is configured to share the load resultant from the bending force experienced by the lower beam section through the first and second vertical beam sections.

3. The trailer assembly of claim 1, further comprising:
   a second main beam assembly extending from the forward end of the trailer assembly to the rear end of the trailer assembly, wherein the second main beam assembly runs parallel to the first main beam assembly.

4. The trailer assembly of claim 3, wherein the second main beam assembly comprises:
   a forward portion that extends from the forward end of the trailer assembly;
   a rear portion that extends to the rear end of the trailer assembly; and
   a middle portion connected between the forward portion and the rear portion, wherein the middle portion comprises:
   an upper beam section; and
   a lower beam section vertically separated from the upper beam section,
   wherein the upper beam section is configured to share a load resultant from a bending force experienced by the lower beam section.

5. The trailer assembly of claim 4, further comprising a tie rod extending from the middle portion of the first beam assembly to the middle portion of the second beam assembly.

6. The trailer assembly of claim 3, further comprising:
   a plurality of suspension beams connected between the first and the second main beam assemblies; and
   a plurality of axles operatively connected to the plurality of suspension beams.

7. The trailer assembly of claim 6, further comprising:
   a reel configured to carry coiled tubing, the reel positioned between the middle portion the first main beam assembly and the middle portion of the second main beam assembly.

8. The trailer assembly of claim 7, wherein the plurality of axles are positioned rearward of the reel.

9. The trailer assembly of claim 7, further comprising:
   an injector assembly positioned between the reel and the rear end of the trailer assembly and configured to deploy and retrieve the coiled tubing.

10. The trailer assembly of claim 9, further comprising:
    an operator cabin position between the reel and the front end of the trailer assembly and configured to provide controls for the injector assembly.

11. A coiled tubing unit comprising:
    a trailer that comprises:
    a first main beam assembly extending from a forward end of the trailer to a rear end of the trailer, wherein the first main beam assembly comprises:
    a forward portion adjacent the forward end of the trailer;
    a rear portion adjacent the rear end of the trailer; and
    a middle portion connected between the forward portion and the rear portion, wherein the middle portion comprises:
    an upper beam section;
    a lower beam section vertically separated from the upper beam section; and
    first and second vertical beam sections connected to the lower beam section with rigid, bending load transferring connections,
    wherein the upper beam section is configured to share a load resultant from a bending force experienced by the lower beam section; and
    a reel configured to carry coiled tubing, the reel positioned adjacent the middle portion of the first main beam assembly of the trailer.

12. The coiled tubing unit of claim 11, wherein the upper beam section is configured to share the load resultant from the bending force experienced by the lower beam section through the first and second vertical beam sections.

13. The coiled tubing unit of claim 11, wherein the trailer further comprises:
    a second main beam assembly extending from the forward end of the trailer to the rear end of the trailer, wherein the second main beam assembly runs parallel to the first main beam assembly.

14. The coiled tubing unit of claim 13, wherein the second main beam assembly comprises:
    a forward portion adjacent the forward end of the trailer;
    a rear portion adjacent the rear end of the trailer; and a middle portion connected between the forward portion and the rear portion, wherein the middle portion comprises:

an upper beam section; and a lower beam section vertically separated from the upper beam section, wherein the upper beam section is configured to share a load resultant from a bending force experienced by the lower beam section.

15. The coiled tubing unit of claim 14, wherein the trailer further comprises a tie rod connecting the upper beam section of the middle portion of the first main beam assembly to the upper beam section of the middle portion of the second main beam assembly.

16. The coiled tubing unit of claim 13, wherein the trailer further comprises:

a plurality of suspension beams connected between the first and the second main beam assemblies; and a plurality of axles operatively connected to the plurality of suspension beams.

17. The coiled tubing unit of claim 16, further comprising:

a tractor configured to pull the trailer; and a trailer jeep connected between the tractor and the trailer.

18. The coiled tubing unit of claim 16, wherein the plurality of axles are positioned rearward of the reel.

19. The coiled tubing unit of claim 17, further comprising:

an injector assembly positioned between the reel and the rear end of the trailer and configured to deploy and retrieve the coiled tubing.

20. The coiled tubing unit of claim 19, further comprising:

an operator cabin position between the reel and the front end of the trailer and configured to provide controls for the injector assembly.

\* \* \* \* \*